United States Patent
Otani et al.

(10) Patent No.: US 11,144,164 B2
(45) Date of Patent: Oct. 12, 2021

(54) POSITION DETECTION METHOD, POSITION DETECTION DEVICE, AND INTERACTIVE PROJECTOR

(71) Applicant: SEIKO EPSON CORPORATION, Tokyo (JP)

(72) Inventors: Makoto Otani, Matsumoto (JP); Akira Ikeda, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/830,840

(22) Filed: Mar. 26, 2020

(65) Prior Publication Data

US 2020/0310589 A1 Oct. 1, 2020

(30) Foreign Application Priority Data

Mar. 27, 2019 (JP) .............................. JP2019-059590

(51) Int. Cl.
*G06F 3/042* (2006.01)

(52) U.S. Cl.
CPC .................. *G06F 3/0421* (2013.01)

(58) Field of Classification Search
None
See application file for complete search history.

(56) References Cited

U.S. PATENT DOCUMENTS

| | | | |
|---|---|---|---|
| 2004/0046736 A1* | 3/2004 | Pryor | A63F 13/04 345/156 |
| 2010/0050133 A1* | 2/2010 | Nishihara | G06F 3/0425 715/863 |
| 2013/0088461 A1* | 4/2013 | Shamaie | G06F 3/017 345/175 |
| 2017/0329458 A1 | 11/2017 | Kanemaru et al. | |
| 2018/0091718 A1 | 3/2018 | Kusumi et al. | |

FOREIGN PATENT DOCUMENTS

| | | |
|---|---|---|
| JP | 2001-194128 A | 7/2001 |
| JP | 2009-008447 A | 1/2009 |
| JP | 2018-54412 A | 4/2018 |
| WO | 2016/092617 A1 | 6/2016 |

* cited by examiner

*Primary Examiner* — Amare Mengistu
*Assistant Examiner* — Sarvesh J Nadkarni
(74) *Attorney, Agent, or Firm* — Oliff PLC

(57) ABSTRACT

The position detection method includes the steps of (a) obtaining a first taken image by imaging a pointing element with an operation surface as a background using a first camera while performing illumination with a first illumination section disposed so that a shadow of the pointing element on the operation surface is not substantially imaged by the first camera, (b) obtaining a second taken image by imaging the pointing element with the operation surface as a background using a second camera disposed at a different position from a position of the first camera while performing illumination with a second illumination section disposed so that the shadow of the pointing element on the operation surface is not substantially imaged by the second camera, and (c) detecting a position of the pointing element with respect to the operation surface using the first taken image and the second taken image.

13 Claims, 13 Drawing Sheets

FIG. 3

POSITION DETECTION METHOD, POSITION DETECTION DEVICE, AND INTERACTIVE PROJECTOR

The present application is based on, and claims priority from JP Application Serial Number 2019-059590, filed Mar. 27, 2019, the disclosure of which is hereby incorporated by reference herein in its entirety.

BACKGROUND

1. Technical Field

The present disclosure relates to a technology for detecting a position of a pointing element.

2. Related Art

In International Publication No. WO 2016/092617, there is disclosed a projector capable of projecting a projected screen on a screen, and at the same time taking an image including a pointing element such as a finger with a camera to detect the position of the pointing element using the taken image. The projector recognizes that a predetermined instruction such as drawing is input to the projected screen when the tip of the pointing element has contact with the screen, and then redraws the projected screen in accordance with the instruction. Therefore, it is possible for the user to input a variety of instructions using the projected screen as a user interface. The projector of the type capable of using the projected screen on the screen as a user interface capable of input as described above is referred to as an "interactive projector." Further, a screen surface as a surface used for the input of the instruction using the pointing element is also referred to as an "operation surface." The position of the pointing element is determined using triangulation using a plurality of images taken by a plurality of cameras.

However, in the related art, the pointing element and a shadow of the pointing element in the taken image are discriminated to detect the position of the pointing element. When the discrimination between the pointing element and the shadow of the pointing element is insufficient, there is a problem that the detection accuracy of the position of the pointing element is not necessarily sufficient due to the influence of the shadow.

SUMMARY

According to an aspect of the present disclosure, there is provided a position detection method of detecting a position of a pointing element with respect to an operation surface. The position detection method includes (a) obtaining a first taken image by imaging the pointing element with the operation surface as a background using a first camera while performing illumination with a first illumination section disposed so that a shadow of the pointing element on the operation surface is not substantially imaged by the first camera, (b) obtaining a second taken image by imaging the pointing element with the operation surface as a background using a second camera disposed at a different position from a position of the first camera while performing illumination with a second illumination section disposed so that the shadow of the pointing element on the operation surface is not substantially imaged by the second camera, and (c) detecting a position of the pointing element with respect to the operation surface using the first taken image and the second taken image.

The present disclosure can be realized in a variety of aspects other than the position detection method such as a position detection device or an interactive projector, a computer program for realizing the method or a function of the device thereof, or a nonvolatile recording medium or the like storing the computer program.

BRIEF DESCRIPTION OF THE DRAWINGS

FIG. 3 is a diagram showing an example of when a shadow does not substantially occur in the taken image.

DESCRIPTION OF EXEMPLARY EMBODIMENTS

A. First Embodiment

Figure 1:
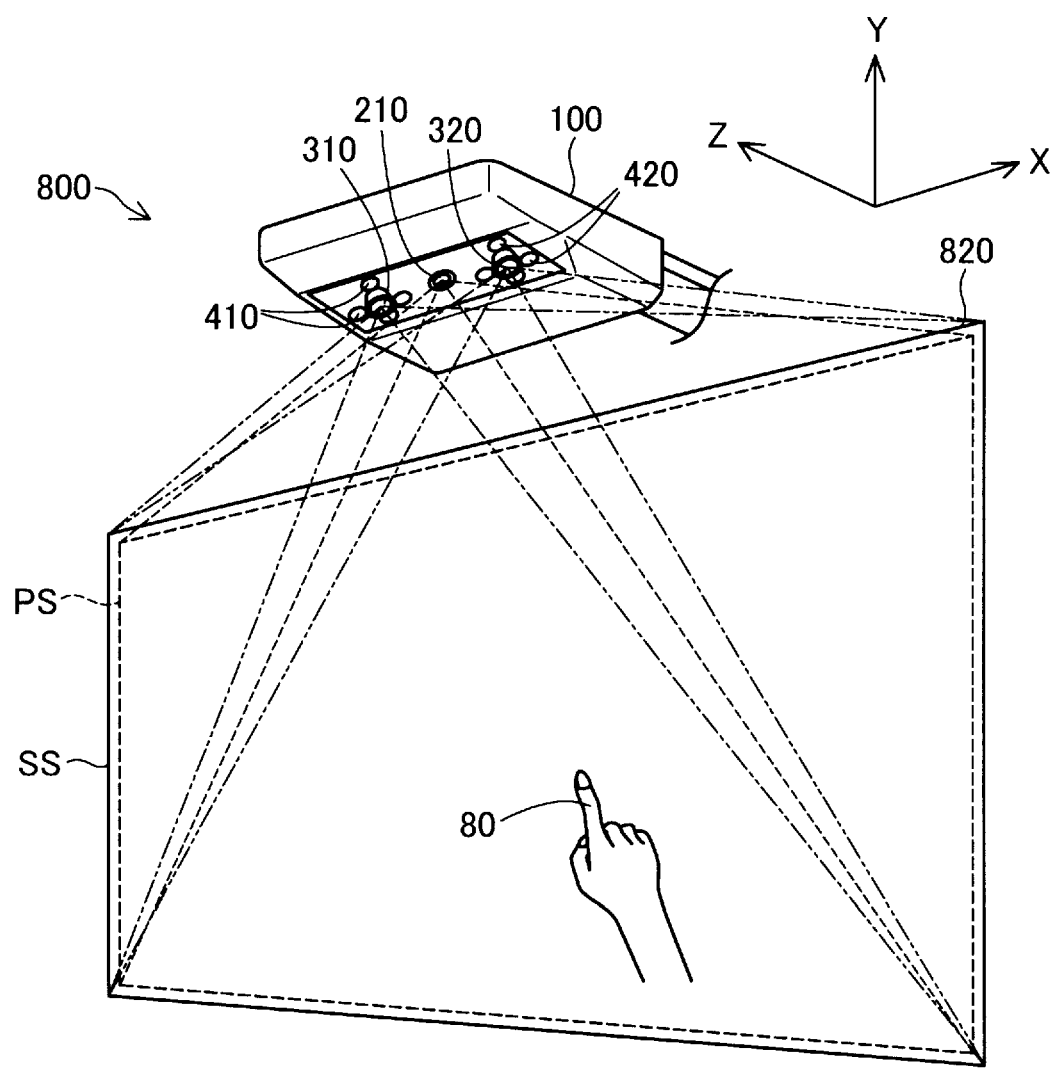
FIG. 1 is a perspective view of an interactive projection system according to a first embodiment.

FIG. 1 is a perspective view of an interactive projection system 800 in a first embodiment. The system 800 has an interactive projector 100 and a screen plate 820. A front surface of the screen plate 820 is used as an operation surface SS to be used for inputting an instruction using a pointing element 80. The operation surface SS is also used as a projection surface on which a projected screen PS is projected. The projector 100 is fixed to a wall surface or the like, and is installed in front of and above the screen plate 820. It should be noted that although the operation surface SS is vertically arranged in FIG. 1, it is also possible to use the system 800 with the operation surface SS arranged horizontally. In FIG. 1, the frontward direction of the screen plate 820 is a Z direction, the upward direction is a Y direction, and the rightward direction is an X direction. For example, assuming that Z=0 is true, the position in a plane of the operation surface SS can be detected in the two-dimensional coordinate system (X, Y).

The projector 100 has a projection lens 210 for projecting an image on the screen plate 820, two cameras, namely a first camera 310 and a second camera 320, for taking an image including the pointing element 80, and two illumination sections, namely a first illumination section 410 and a second illumination section 420, for emitting light for detecting the pointing element 80 and corresponding respectively to the first camera 310 and the second camera 320.

The projection lens 210 projects the projected screen PS on the operation surface SS. The projected screen PS includes an image drawn inside the projector 100. When the image drawn inside the projector 100 does not exist, the projector 100 irradiates the projected screen PS with light to display a white image. In the present specification, the "operation surface SS" means a surface used for inputting an instruction using the pointing element 80. Further, the "projected screen PS" means an area of an image projected on the operation surface SS by the projector 100.

In this interactive projection system 800, it is possible to use at least one pointing element 80 of a non-light emitting type. As the pointing element 80, it is possible to use a non-light emitting object such as a finger or a pen. Further, it is preferable for a tip part for pointing in the pointing element 80 of the non-light emitting type to be excellent in reflective property with respect to infrared light, and further have a retroreflective property.

The first camera 310 and the second camera 320 are each disposed so as to be able to image the entire operation surface SS, and each have a function of taking the image of the pointing element 80 with the operation surface SS as a background. The first camera 310 and the second camera 320 are each capable of taking an image in a specific wavelength range by installing a filter or the like. The first camera 310 and the second camera 320 receive the light reflected by the operation surface SS and the pointing element 80 out of the light emitted from the first illumination section 410 and the second illumination section 420 to thereby form the images including the pointing element 80, respectively. In the present embodiment, the first illumination section 410 and the second illumination section 420 emit the infrared light as the detection light, and thus, the first camera 310 and the second camera 320 take the images of the infrared light, respectively. In these images, the pointing element 80 is detected as a bright point brighter than the operation surface SS. As the detection light, it is possible to use other light than infrared light. When using visible light as the detection light, it is preferable to configure the interactive projection system 800 so as not to degrade the display quality of the projected screen PS.

The first illumination section 410 has a function as an ambient illumination section for illuminating the periphery of the optical axis of the first camera 310 with the infrared light. In the example shown in FIG. 1, the first illumination section 410 includes four illumination elements 411 arranged so as to surround the periphery of the first camera 310. The first illumination section 410 is configured so as not to substantially generate a shadow of the pointing element 80 by the first illumination section 410 when taking the image of the pointing element 80 with the first camera 310. Here, the phrase "not to substantially generate the shadow" means that the shadow is light to the extent that the shadow of the pointing element 80 does not affect the process for obtaining a three-dimensional position of the pointing element 80 using the image. The second illumination section 420 includes four illumination elements 421 arranged so as to surround the periphery of the second camera 320. The second illumination section 420 also has substantially the same configuration and function as those of the first illumination section 410, and has a function of an ambient illumination section for illuminating the periphery of an optical axis of the second camera 320 with the infrared light. By providing the configuration described above to the first illumination section 410, the first camera 310 does not substantially image the shadow of the pointing element 80 existing between the operation surface SS and the first camera 310 on the operation surface SS. Further, by providing the configuration described above to the second illumination section 420, the second camera 320 does not substantially image the shadow of the pointing element 80 existing between the operation surface SS and the second camera 320 on the operation surface SS. These conditions will be described using FIG. 2 and FIG. 3.

Figure 2:
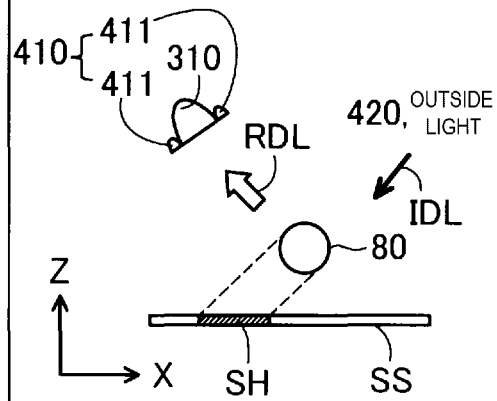
FIG. 2 is a diagram showing an example of when a shadow occurs in a taken image.

FIG. 2 is a diagram showing an example of when a shadow occurs in a taken image. In FIG. 2, there are shown a positional relationship between the pointing element 80 and the operation surface SS and an image of the taken image when light from other parts than the first illumination section 410 exists in the state in which the first illumination section 410 is put off to become in the OFF state. In FIG. 2, as the light from other parts than the first illumination section 410, there is shown the outside light as the light from the second illumination section 420 or the light from other parts than the second illumination section 420. The upper part of FIG. 2 is a diagram of the pointing element 80 viewed from a direction along the operation surface SS, and the lower part of FIG. 2 shows taken images IM1a and IM1b taken by the first camera 310 at that moment. The left side "A" in FIG. 2 shows the state in which the pointing element 80 is separated from the operation surface SS, and the right side "B" in FIG. 2 shows the state in which the pointing element 80 has contact with the operation surface. In FIG. 2, since the first illumination section 410 is in the OFF state, the shadow of the pointing element 80 on the operation surface SS due to the light other than the light from the first illumination section 410 is taken in the taken images IM1a and IM1b. In the taken image IM1a in the state "A" in which the pointing element 80 and the operation surface SS are separated from each other, it is possible to distinguish the pointing element 80 and the shadow SH from each other, and it is possible to detect a characteristic point of the pointing element 80. However, in the taken image IM1b in the state "B" in which the pointing element 80 and the operation surface SS have contact with each other, it is difficult to distinguish the pointing element 80 and the shadow SH from each other, and the accuracy of detecting the characteristic point of the pointing element 80 degrades.

Figure 3:
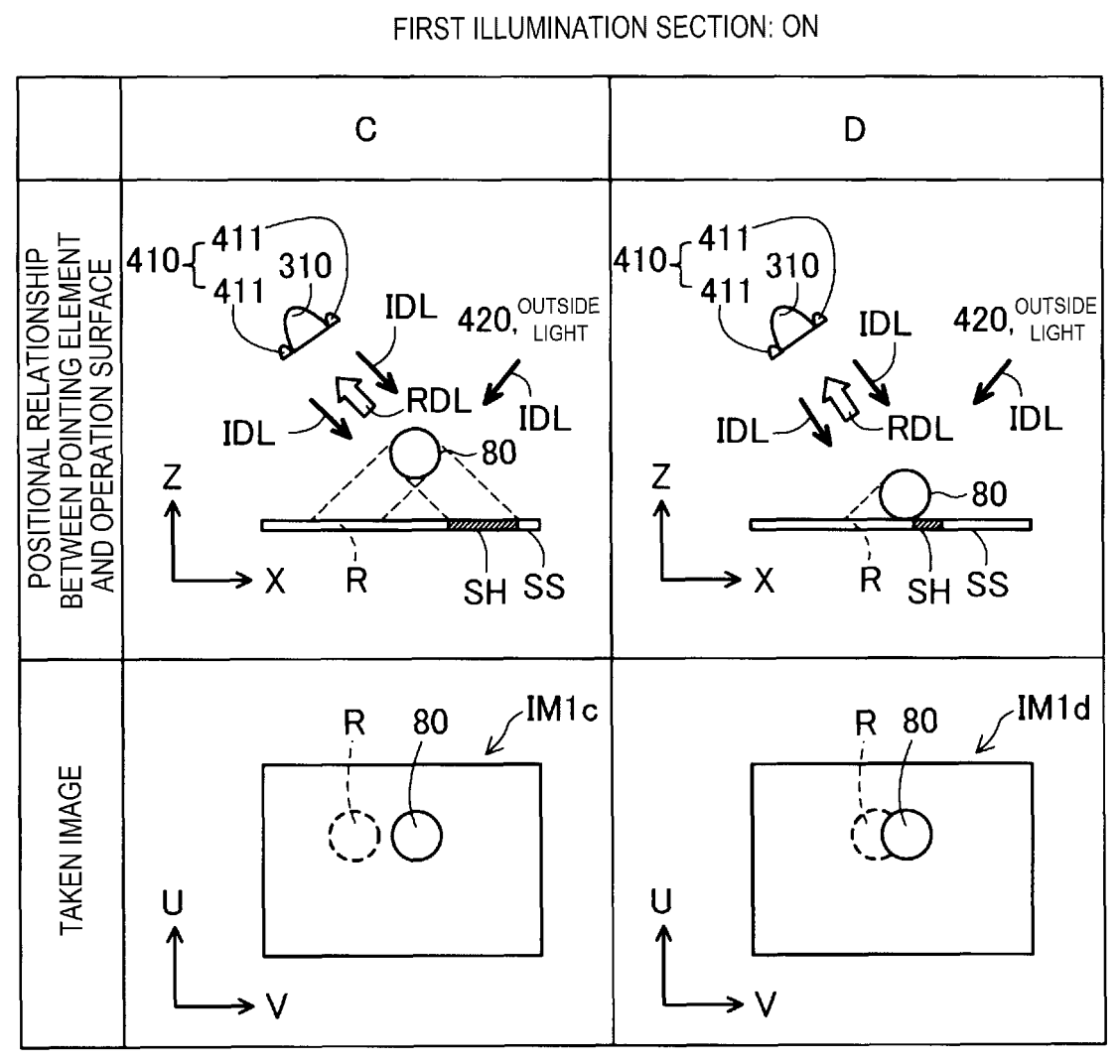

FIG. 3 is a diagram showing an example of when a shadow does not substantially occur in the taken image. In FIG. 3, there are shown the positional relationship between the pointing element 80 and the operation surface SS and an image of the taken image when the first illumination section 410 is put on to become in the ON state. The upper part of FIG. 3 is a diagram of the pointing element 80 viewed from the direction along the operation surface SS, and the lower part of FIG. 3 shows taken images IM1c and IM1d taken by the first camera 310 at that moment. The left side "C" in FIG. 3 shows the state in which the pointing element 80 is separated from the operation surface SS, and the right side "D" in FIG. 3 shows the state in which the pointing element 80 has contact with the operation surface. In FIG. 3, there is shown an area R where the shadow SH appears in FIG. 2. In FIG. 3, since the first illumination section 410 is in the ON state, and the first illumination section 410 functions as an ambient illumination section, the shadow of the pointing element 80 on the operation surface SS is not substantially taken in the taken images IM1c and IM1d. In the taken image IM1c in the state "C" in which the pointing element 80 and the operation surface SS are separated from each other, the characteristic point of the pointing element 80 can easily be detected. Further, since the shadow SH of the pointing element 80 is not substantially taken also in the taken image IM1d in the state "D" in which the pointing element 80 and the operation surface SS have contact with each other, the accuracy of detecting the characteristic point of the pointing element 80 increases. It should be noted that when putting off the second illumination section 420 in FIG. 3, it is possible to make the image taken by the first camera 310 further exclude the shadow of the pointing element 80 due to the second illumination section 420.

Figure 4:
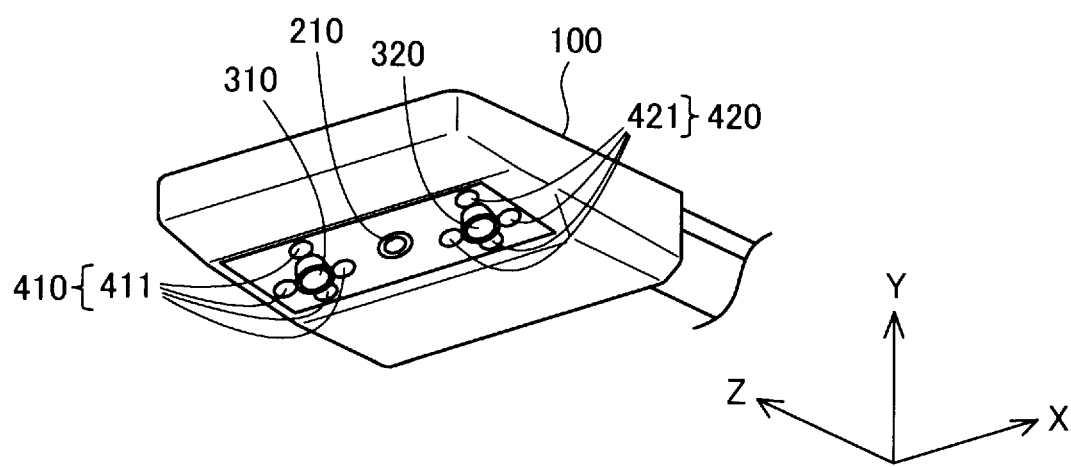
FIG. 4 is an enlarged view of a projector.
Figure 5:
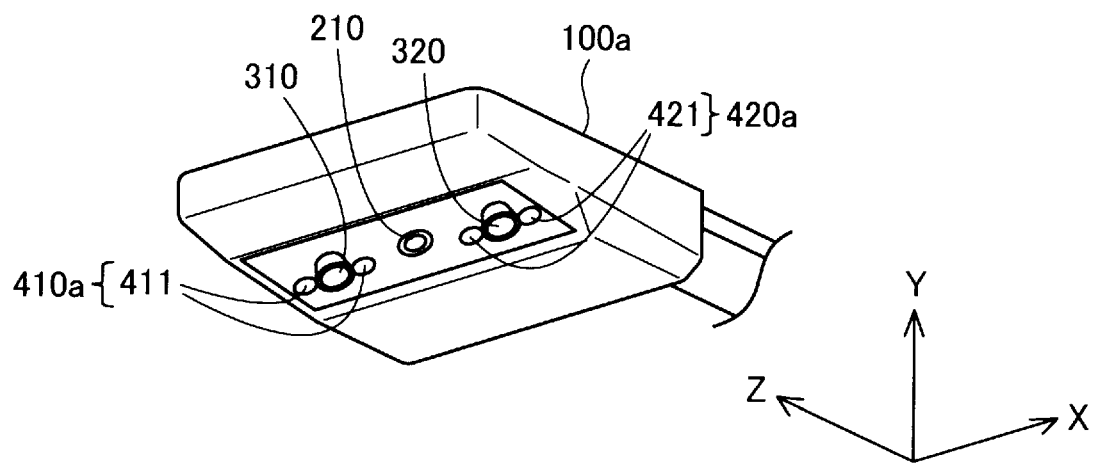
FIG. 5 is another example of a first illumination section and a second illumination section.
Figure 6:
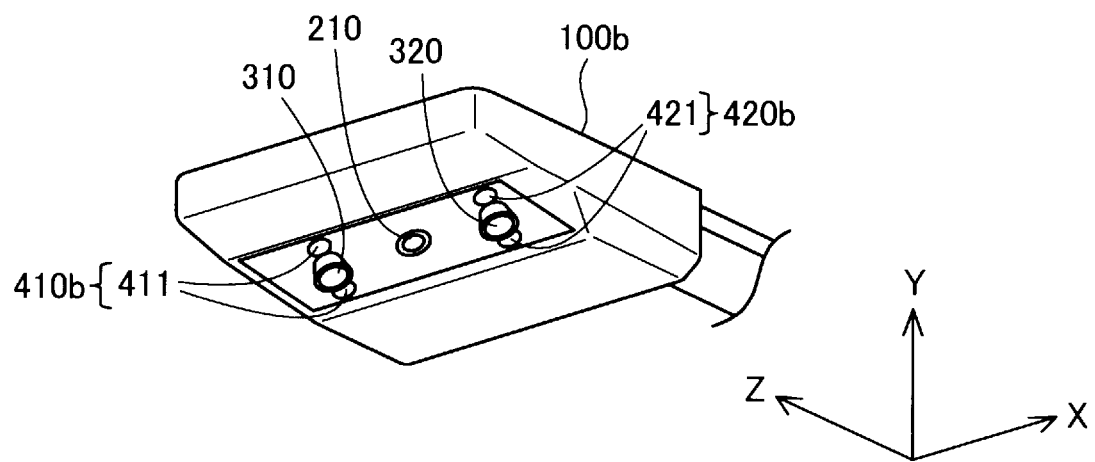
FIG. 6 is another example of the first illumination section and the second illumination section.
Figure 7:
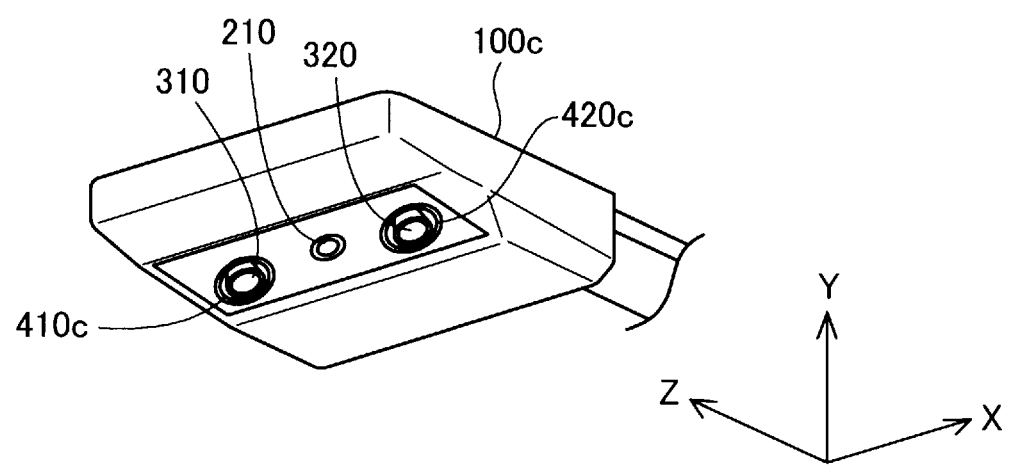
FIG. 7 is another example of the first illumination section and the second illumination section.

FIG. 4 is an enlarged view of the projector 100. In the projector 100 according to the present embodiment, as described above, the number of the illumination elements 411 constituting the first illumination section 410 is four, and the number of the illumination elements 421 constituting the second illumination section 420 is four. It should be noted that the number of the illumination elements 411 is not limited to four, but can also be set as an arbitrary number no smaller than two. It should be noted that it is preferable for the plurality of illumination elements 411 constituting the first illumination section 410 to be disposed at the positions rotationally symmetric around the first camera 310. Further, instead of using the plurality of illumination elements 411, it is also possible to constitute the first illumination section 410 using an illumination element shaped like a ring. Further, it is also possible to arrange that a coaxial illumination section for emitting the infrared light through a lens of the first camera 310 is used as the first illumination section 410. These modified example can also be applied to the second illumination section 420. It should be noted that when disposing N cameras assuming N as an integer no smaller than 2, the ambient illumination section or the coaxial illumination section is disposed for each of the cameras. These examples are shown in FIG. 5 through FIG. 7. The projector 100a shown in FIG. 5 is provided with a first illumination section 410a having the two illumination elements 411 arranged at positions symmetric in the X direction about the first camera 310, and a second illumination section 420a having the two illumination elements 421 arranged at positions symmetric in the X direction about the second camera 320. The projector 100b shown in FIG. 6 is provided with a first illumination section 410b having the two illumination elements 411 arranged at positions symmetric in the Z direction about the first camera 310, and a second illumination section 420b having the two illumination elements 421 arranged at positions symmetric in the Z direction about the second camera 320. The projector 100c shown in FIG. 7 is provided with a first illumination section 410c arranged so as to surround the periphery of the optical axis of the first camera 310, and a second illumination section 420c arranged so as to surround the periphery of the optical axis of the second camera 320. The first illumination section 410c functions as the coaxial illumination section for performing coaxial illumination with respect to the first camera 310, and the second illumination section 420c functions as the coaxial illumination section for performing the coaxial illumination with respect to the second camera 320.

Figure 8:
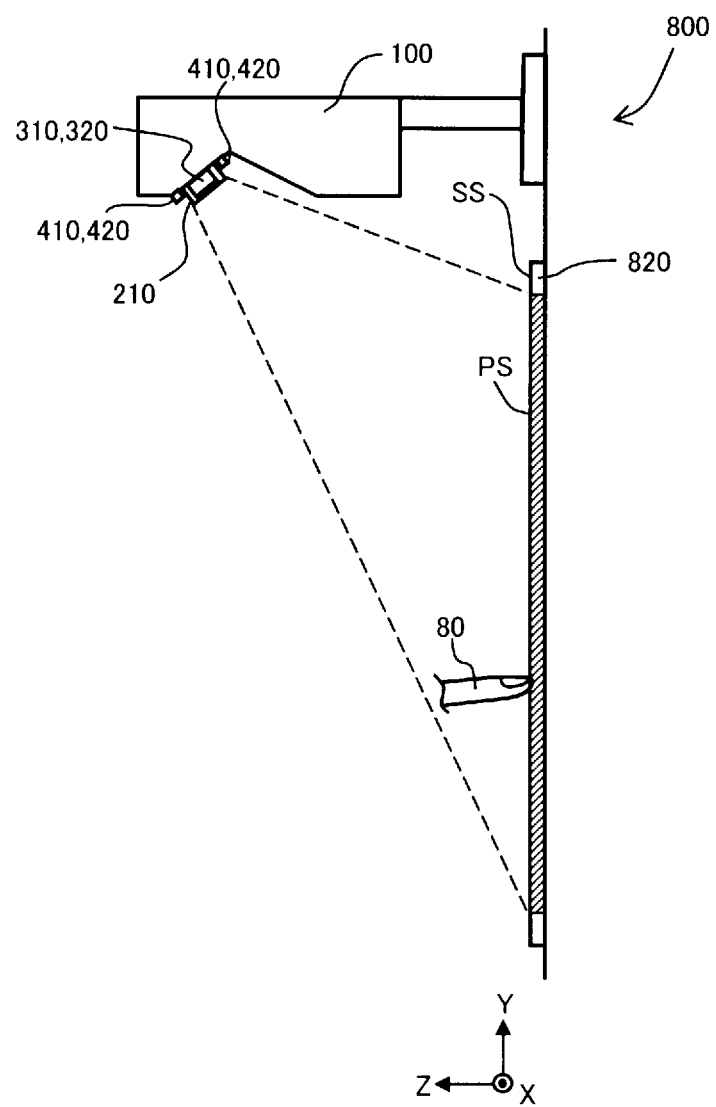
FIG. 8 is a side view of an interactive projection system.
Figure 9:
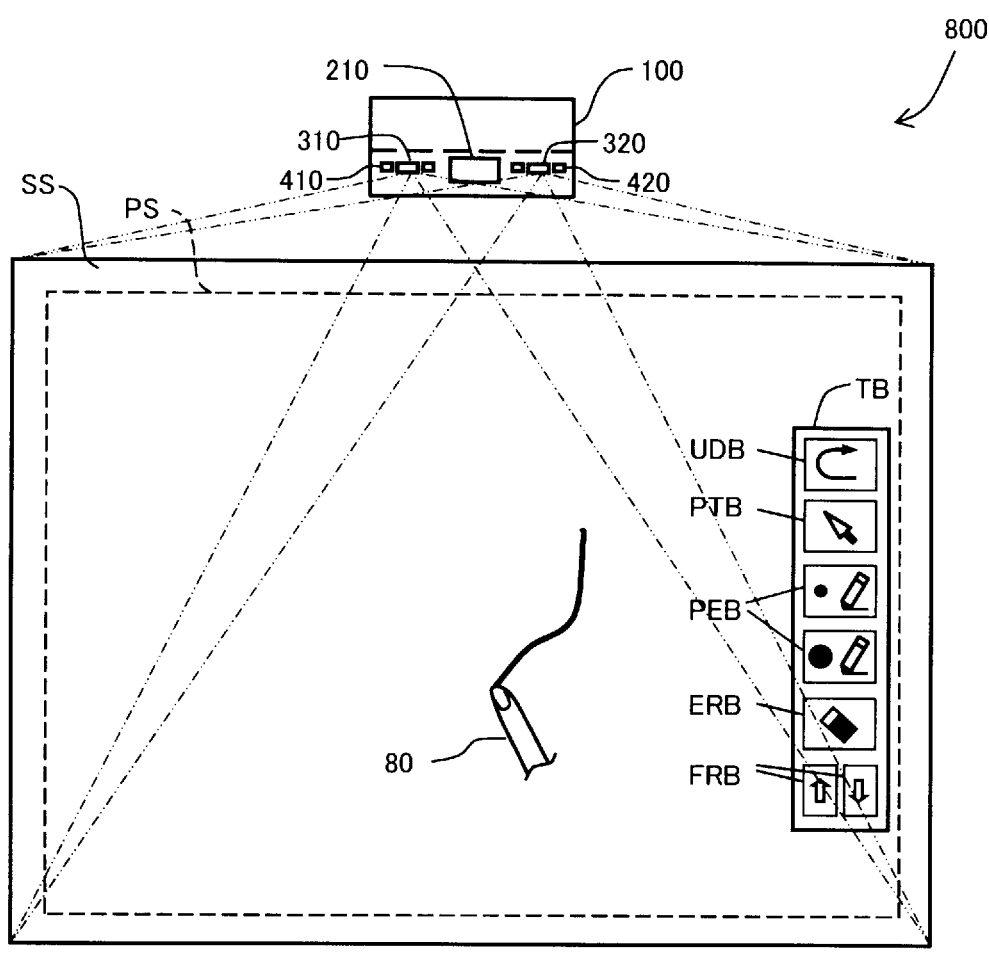
FIG. 9 is a front view of the interactive projection system.

FIG. 8 is a side view of the interactive projection system 800, and FIG. 9 is a front view thereof. In the present specification, a direction from a left end toward a right end of the operation surface SS is defined as the X direction, a direction from a lower end toward an upper end of the operation surface SS is defined as the Y direction, and a direction parallel to a normal line of the operation surface SS is defined as the Z direction. It should be noted that the X direction is also referred to as a "width direction," the Y direction is also referred to as an "upward direction," and the Z direction is also referred to as a "distance direction" for the sake of convenience. It should be noted that in FIG. 8, the range of the projected screen PS out of the screen plate 820 is provided with hatching for the sake of convenience of illustration. The coordinate position of the operation surface SS where the projected screen PS is projected can be detected as the two-dimensional coordinate of the two-dimensional coordinate system (X, Y) assuming, for example, Z=0 is true. Further, the two-dimensional coordinate system (V, U) of the taken image by the first camera 310 and the two-dimensional coordinate system (η, ξ) of the taken image by the second camera 320 are different from each other due to the arrangement and the characteristics of the first camera 310 and the second camera 320, and are different from the coordinate system (X, Y) of the projected screen PS and the operation surface SS. These coordinate systems are made to correspond to each other with conversion coefficients and so on obtained by a calibration process.

The example shown in FIG. 9 represents the state in which the interactive projection system 800 operates in a whiteboard mode. The whiteboard mode is a mode in which the user can arbitrarily draw a picture on the projected screen PS using the pointing element 80. The projected screen PS including a toolbox TB is projected on the operation surface SS. The toolbox TB includes a cancel button UDB for undoing the process, a pointer button PTB for selecting a mouse pointer, pen buttons PEB for selecting pen tools for drawing, an eraser button ERB for selecting an eraser tool for erasing the image having been drawn, and forward/backward buttons FRB for respectively feeding the screen forward and backward. By clicking these buttons using the pointing element 80, the user can perform processes corresponding to the respective buttons, or can select tools corresponding to the respective buttons. It should be noted that it is also possible to arrange that the mouse pointer is selected as a default tool immediately after starting up the system 800. In the example shown in FIG. 9, there is described the process in which the user selects the pen tool, and then moves the tip part of the pointing element 80 within the projected screen PS in the state of having contact with the operation surface SS to thereby draw a line in the projected screen PS. The drawing of the line is performed by a projection image generation section 500 described later.

It should be noted that the interactive projection system 800 can operate in other modes than the whiteboard mode. For example, this system 800 can also operate in a PC interactive mode for displaying an image represented by the data having been transferred from a personal computer not shown via a communication line in the projected screen PS. In the PC interactive mode, an image of the data of, for example, spreadsheet software is displayed, and it becomes possible to perform input, generation, correction, and so on of the data using a variety of tools and icons displayed in the image.

Figure 10:
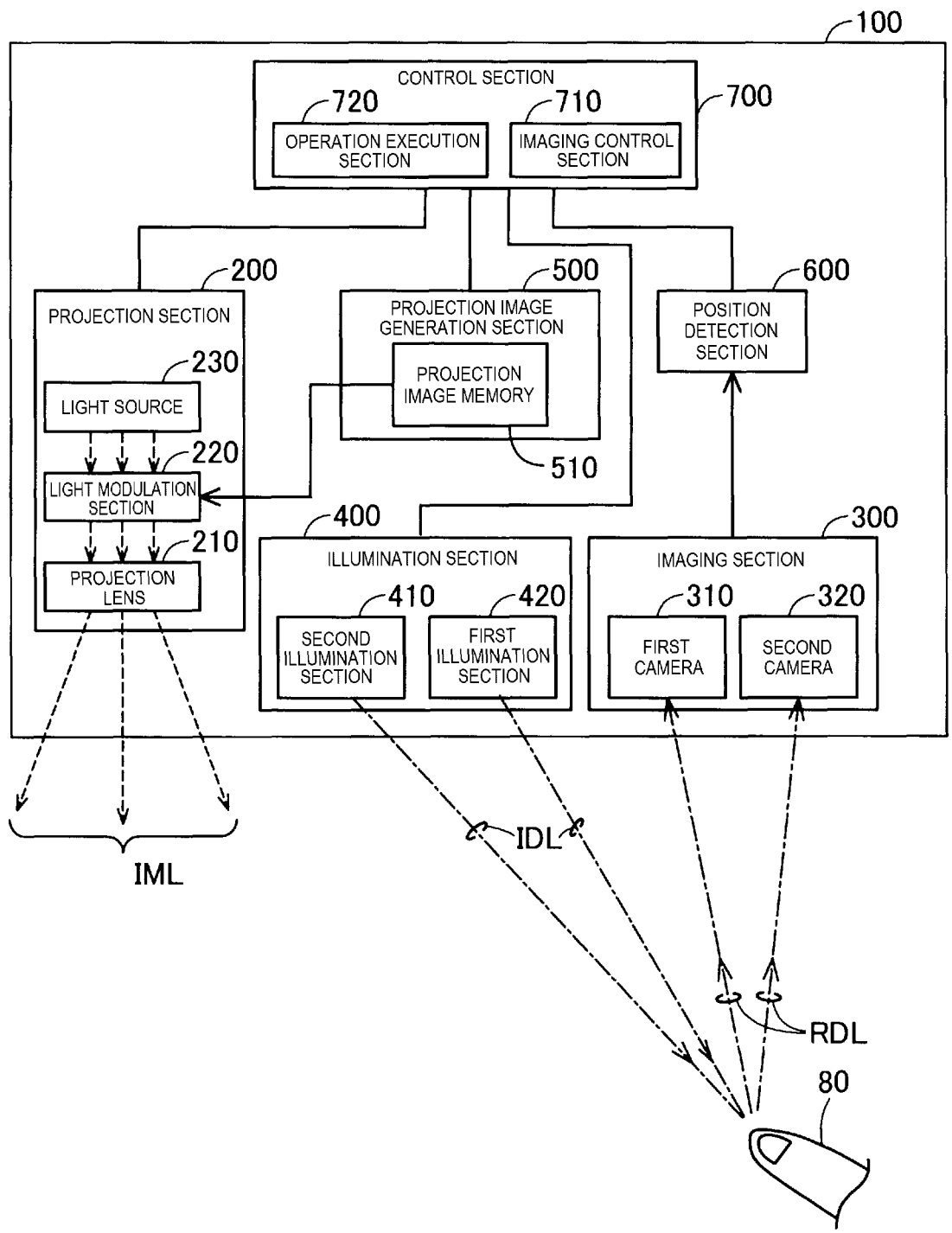
FIG. 10 is a functional block diagram of an interactive projector.

FIG. 10 is a functional block diagram of the interactive projector 100. The projector 100 has a control section 700, a projection section 200, the projection image generation section 500, a position detection section 600, an imaging section 300, and the illumination section 400. The imaging section 300 includes the first camera 310 and the second camera 320, and the illumination section 400 includes the first illumination section 410 and the second illumination section 420.

The control section 700 performs control of each of the sections of the projector 100. Further, the control section 700 has a function as an imaging control section 710 for taking the image of the pointing element 80 using the imaging section 300 and the illumination section 400. Further, the control section 700 has a function as an operation execution section 720 for recognizing the content of the instruction having been made on the projected screen PS by the pointing element 80 detected by the position detection section 600, and at the same time commanding the projection image generation section 500 to generate or change the projection image in accordance with the content of the instruction. In the present embodiment, when the contact of the pointing element 80 with the operation surface SS is detected, the control section 700 recognizes that an instruction by the user has been performed.

The projection image generation section 500 has an image memory 510 for storing the projection image, and has a function of generating the projection image to be projected on the operation surface SS by the projection section 200. Further, the projection image generation section 500 also has a function of superimposing the drawing of a line and so on by the pointing element 80 on the projection image stored in the image memory 510. It is preferable for the projection image generation section 500 to be further provided with a function as a keystone distortion correction section for correcting a keystone distortion of the projected screen PS.

The projection section 200 has a function of projecting the projection image having been generated by the projection image generation section 500 on the operation surface SS. The projection section 200 has a light modulation section 220 and a light source 230 besides the projection lens 210 described with reference to FIG. 8. The light modulation section 220 modulates the light from the light source 230 in accordance with the projection image data provided from the image memory 510 to thereby form projection image light IML. The projection image light IML is typically color image light including visible light of three colors of RGB, and is projected on the operation surface SS by the projection lens 210. It should be noted that as the light source 230, there can be adopted a variety of types of light sources such as a light emitting diode or a laser diode besides a light source lamp such as a super-high pressure mercury lamp. Further, as the light modulation section 220, there can be adopted a transmissive or reflective liquid crystal panel, a digital mirror device, and so on, and there can also be adopted a configuration provided with a plurality of light modulation sections 220 for the respective colored light beams.

The illumination section 400 has the first illumination section 410 and the second illumination section 420. The first illumination section 410 and the second illumination section 420 are each capable of irradiating throughout the range from the operation surface SS to the space in front of the operation surface SS with irradiated detection light IDL for detecting the tip part of the pointing element 80. The irradiated detection light IDL is infrared light. As described later, the first illumination section 410 and the second illumination section 420 are each lit at an exclusive timing.

The imaging section 300 has the first camera 310 and the second camera 320. The first camera 310 and the second camera 320 each have a function of receiving light in the wavelength region including the wavelength of the irradiated detection light IDL to thereby perform imaging. In the example shown in FIG. 10, there is described the condition in which the irradiated detection light IDL emitted by the illumination section 400 is reflected by the pointing element 80, and then the reflected detection light RDL is received by the first camera 310 and the second camera 320 to be imaged.

The position detection section 600 has a function of obtaining a position of the tip part of the pointing element 80 using the first taken image obtained by the first camera 310 performing imaging and the second taken image obtained by the second camera 320 performing imaging. The position detection section 600 detects the three-dimensional position of the tip part of the pointing element 80 using triangulation or the like based on the first taken image and the second taken image. The position detection section 600 is capable of measuring the distances of the operation surface SS with respect to the first camera 310 and the second camera 320 shown in FIG. 1 as representative distances between the projector 100 and the operation surface SS. These distances can be measured using the triangulation using the taken images obtained by the first camera 310 and the second camera 320 respectively taking, for example, a reference pattern image prepared in advance and projected on the operation surface SS. The position detection section 600 is capable of detecting the position of the pointing element 80 with respect to the operation surface SS using the position of the tip part of the pointing element 80 thus detected and the distances from the first camera 310 and the second camera 320 to the operation surface SS. In the present embodiment, the position detection section 600 determines that the pointing element 80 has contact with the operation surface SS when the distance between the pointing element 80 and the operation surface SS calculated using the first taken image and the second taken image is no larger than a predetermined threshold value.

The functions of the sections of the control section 700 and the function of the position detection section 600 are realized by, for example, a processor in the projector 100 executing a computer program. Further, it is also possible to realize a part of each of the functions of these sections with a hardware circuit such as an FPGA (field-programmable gate array).

Figure 11:
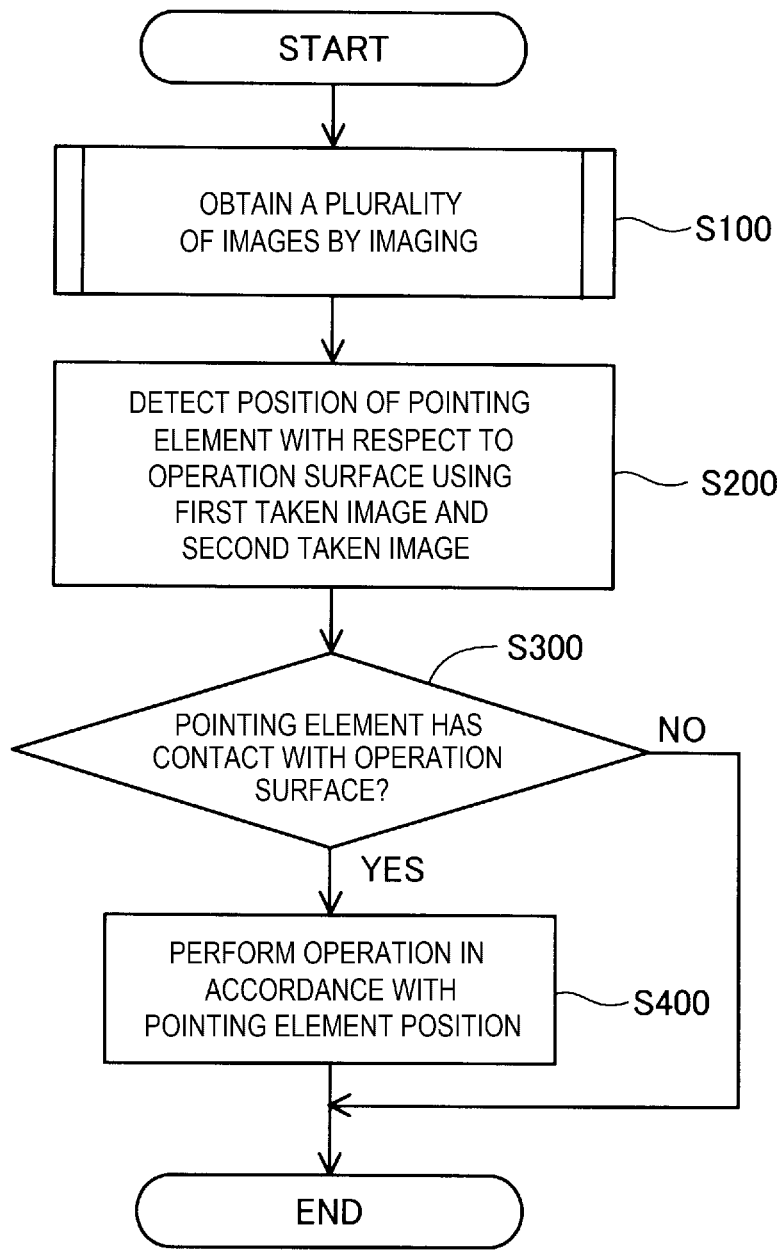
FIG. 11 is a flowchart showing a procedure of a position detection process.

FIG. 11 is a flowchart showing a procedure of the position detection process in the embodiment. This process is repeatedly performed during the operation of the interactive projection system 800.

In the step S100, by the imaging section 300 imaging the pointing element 80 with the operation surface SS as the background, a plurality of images taken by the first camera 310 and the second camera 320 is obtained.

Figure 12:
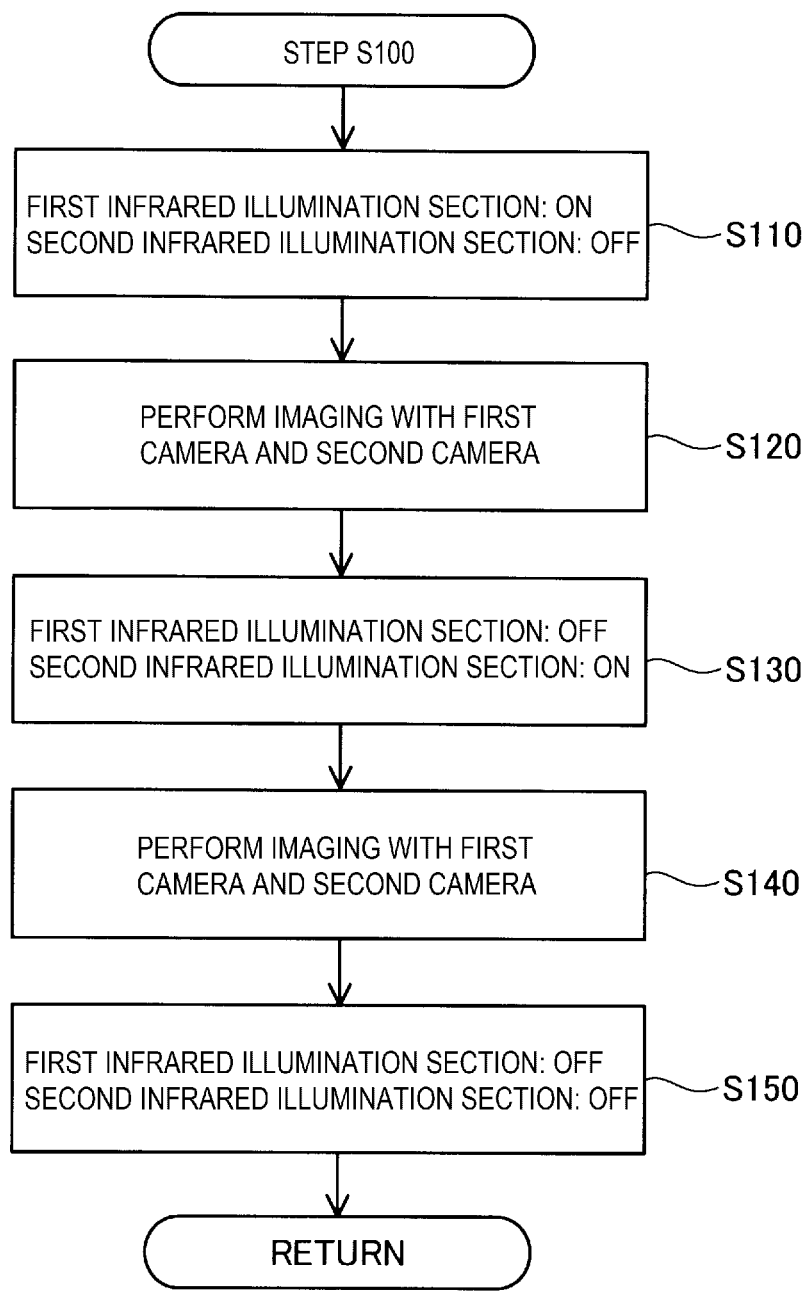
FIG. 12 is a flowchart showing a procedure of an imaging process in the step S100.
Figure 13:
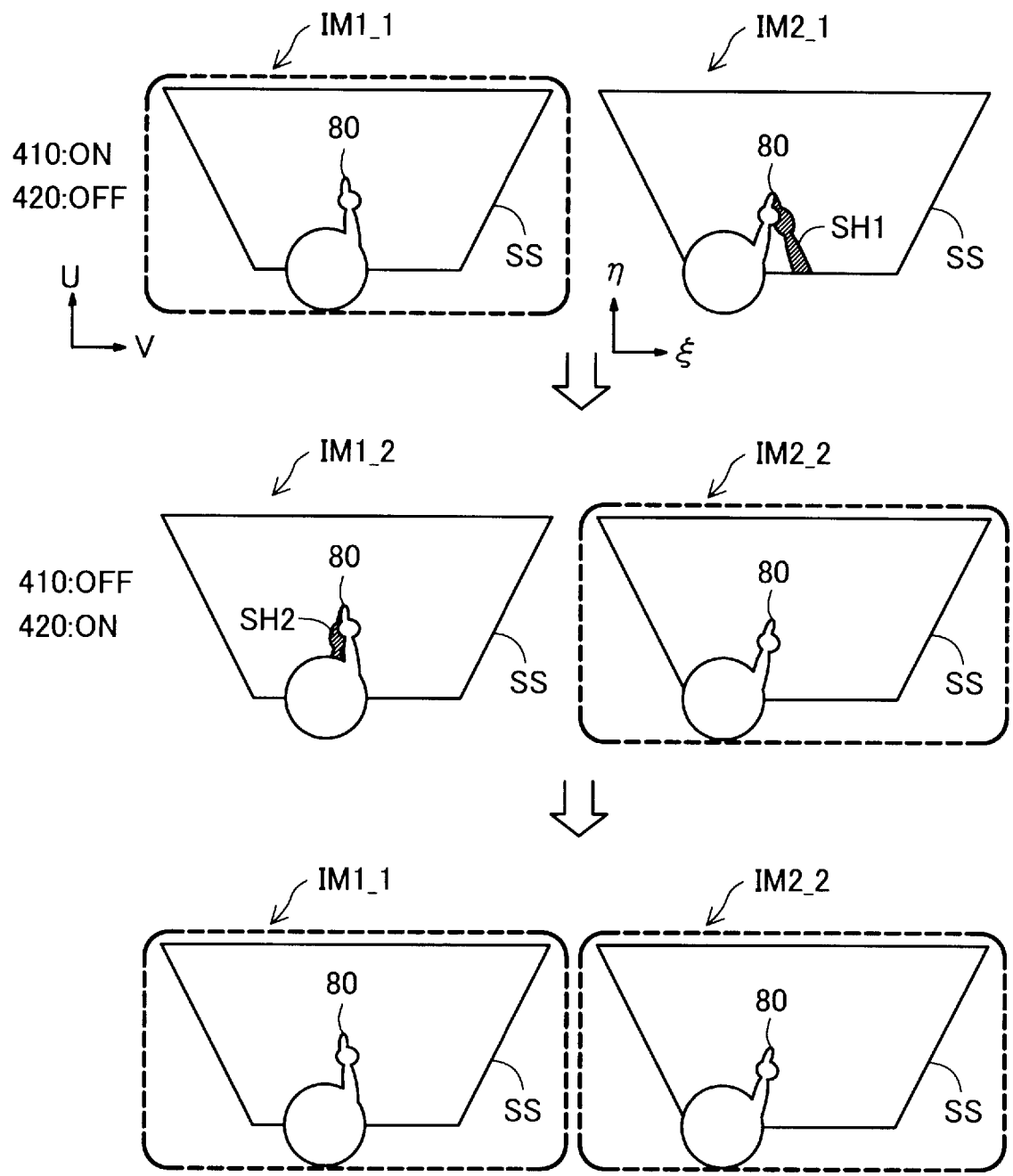
FIG. 13 is an explanatory diagram showing a content of the imaging process.
Figure 14:
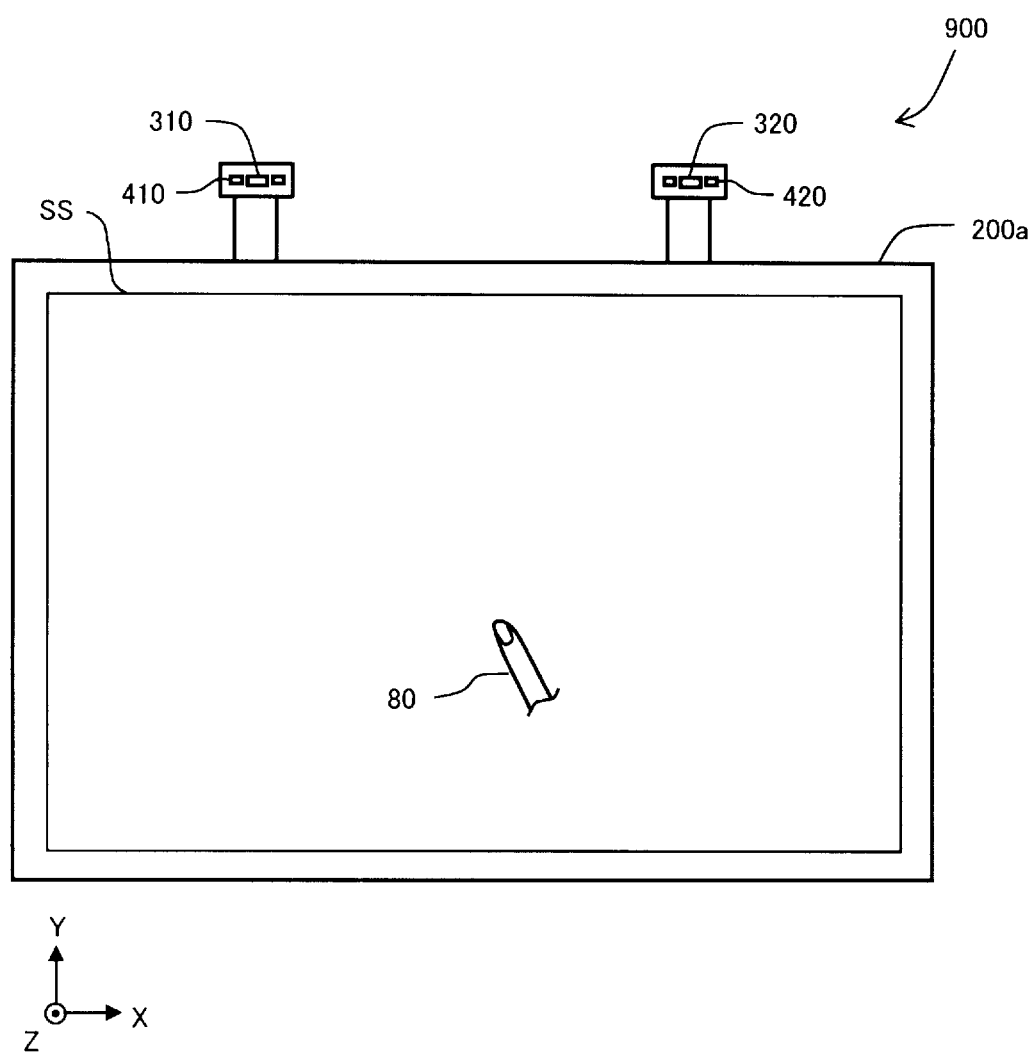
FIG. 14 is a front view of a position detection system in a second embodiment.

FIG. 12 is a flowchart representing a procedure of the imaging process in the step S100 shown in FIG. 11, and FIG. 13 is an explanatory diagram showing a content of the imaging process. In FIG. 14, first images Evil 1 and Evil 2 are represented in the two-dimensional coordinate system (U, V) imaged by the first camera 310, and second images IM2_1 and IM2_2 are represented in the two-dimensional coordinate system (ii, U imaged by the second camera 320. The procedure shown in FIG. 12 is executed under the control by the imaging control section 710.

In the step S110, there is created the state in which the first illumination section 410 is in the ON state and the second illumination section 420 is in the OFF state. In other words, there is created the state in which the first illumination section 410 is put on to perform the illumination, and the second illumination section 420 is put off not to perform the illumination. In the step S120, images are taken using the first camera 310 and the second camera 320. As a result, the taken image IM1_1 shown in an upper left part of FIG. 13 and the taken image IM2_1 are obtained. The dotted line surrounding the periphery of the taken image IM1_1 is provided for emphasis. The taken image IM1_1 is an image including the pointing element 80 with the operation surface SS as the background. As described with reference to FIG. 1, the first illumination section 410 is configured so as not to substantially generate the shadow of the pointing element 80 by the first illumination section 410 when taking the image of the pointing element 80 with the first camera 310. Therefore, the taken image IM1_1 is the taken image taken by the first camera 310 when the first illumination section 410 is put on, and is the first taken image which does not substantially include the shadow of the pointing element 80. On the other hand, the taken image IM2_1 shown in the upper right part of FIG. 13 is the taken image taken by the second camera 320 when the second illumination section 420 is put off, and includes the shadow SH1 of the pointing element 80. It is not necessary to take the taken image IM2_1. The taken image IM1_1 does not include the shadow of the pointing element 80, and can therefore be used for improving the accuracy of the position detection of the tip part of the pointing element 80. In contrast, the taken image IM2_1 includes the shadow SH1 of the pointing element 80, and therefore cannot be used for improving the accuracy of the position detection of the tip part of the pointing element 80.

In the step S130, there is created the state in which the first illumination section 410 is in the OFF state and the second illumination section 420 is in the ON state. In other words, there is created the state in which the first illumination section 410 is put off not to perform the illumination, and the second illumination section 420 is put on to perform the illumination. In the step S140, an image is taken using the second camera 320. As a result, the second image IM2_2 shown in a middle right part of FIG. 13 is obtained. The second illumination section 420 is configured so as not to substantially generate the shadow of the pointing element 80 by the second illumination section 420 when taking the image of the pointing element 80 with the second camera 320. Therefore, the taken image IM2_2 is the image taken by the second camera 320 when the second illumination section 420 is put on, and is the second taken image which does not substantially include the shadow of the pointing element 80. On the other hand, the taken image IM1_2 shown in the middle left part of FIG. 13 is the image taken by the first camera 310 when the first illumination section 410 is put off, and includes the shadow SH2 of the pointing element 80. It is not necessary to take the taken image IM1_2. The taken image IM2_2 does not include the shadow of the pointing element 80, and can therefore be used for improving the accuracy of the position detection of the tip part of the pointing element 80. In contrast, the taken image IM1_2 includes the shadow SH2 of the pointing element 80, and therefore cannot be used for improving the accuracy of the position detection of the tip part of the pointing element 80.

When the imaging in the step S120 and the imaging in the step S140 are completed, there are obtained the first taken image IM1_1 taken by the first camera 310 and not substantially including the shadow and the second taken image IM2_2 taken by the second camera 320 and not substantially including the shadow as shown in the lower part of FIG. 13. In the step S150 shown in FIG. 12, the first illumination section 410 and the second illumination section 420 are set to the OFF state to terminate the process in the step S100, and then wait until the subsequent imaging. It should be noted that the step S150 can be omitted. Further, it is also possible to arrange that the process in FIG. 12 is resumed immediately after the process in FIG. 12 is terminated.

When the process in the step S100 is terminated, in the step S200 shown in FIG. 11, the position detection section 600 obtains the three-dimensional position of the pointing element 80 with the triangulation or the like using the first taken image IM1_1 and the second taken image IM2_2 obtained in the step S100 to detect the position of the pointing element 80 with respect to the operation surface SS. In the present embodiment, the first taken image IM1_1 and the second taken image IM2_2 are converted into the coordinate system of the operation surface SS with the conversion coefficients and so on as needed.

In the step S300 shown in FIG. 11, the position detection section 600 determines whether or not the pointing element 80 has contact with the operation surface SS. The position detection section 600 makes an affirmative determination in the step S300 when the distance AZ between the operation surface SS and the pointing element 80 is no larger than a threshold value Th set in advance. When the distance AZ is no larger than the threshold value Th, the operation execution section 720 performs the operation corresponding to the tip position of the pointing element 80 in the step S400. The threshold value Th is a value with which it is possible to determine that the tip of the pointing element 80 is extremely close to the operation surface SS, and is set in a range of, for example, 3 through 5 mm. The operation in the step S400 is a process on the operation surface SS such as drawing described with reference to FIG. 9. It should be noted that the X-Y coordinate of the tip position of the pointing element 80 in the operation surface SS can be determined using a known method such as pattern matching or feature detection of the pointing element 80 in the first taken image IM1_1 and the second taken image IM2_2.

As described above, in the first embodiment, since the first taken image IM1_1 and the second taken image IM2_2 do not substantially include the shadow SH1 and SH2 of the pointing element 80, it is possible to prevent the position of the pointing element 80 with respect to the operation surface SS from being falsely detected due to the influence of the shadows SH1 and SH2. Therefore, it is possible to improve the detection accuracy of the position of the pointing element 80 with respect to the operation surface SS. Further, it is possible to omit the process of discriminating the pointing element 80 and the shadow from each other in the taken image.

It should be noted that it is also possible to take the first taken image and the second taken image at the same timing. On this occasion, it is sufficient to image the pointing element 80 with the operation surface SS as the background with the first camera 310 and the second camera 320 in the state in which the first illumination section 410 is put on, and at the same time, the second illumination section 420 is put on to obtain the first taken image and the second taken image.

It should be noted that the number of the cameras can also be three or more. In other words, defining N as an integer no smaller than three, it is possible to arrange to dispose N cameras. In this case, the illumination sections are disposed so as to correspond respectively to the cameras. In this case, each of the cameras is selected in sequence, and imaging is performed using the selected camera while performing the illumination with the illumination section disposed so as to correspond to the selected camera without performing the illumination with the illumination sections disposed so as to correspond to the cameras not selected to thereby obtain N taken images in sequence one by one at respective timings different from each other. The N taken images do not substantially include the shadow of the pointing element 80. It is possible for the position detection section 600 to detect the position of the pointing element 80 with respect to the operation surface SS using the triangulation or the like using M sets of taken images each including of two taken images selected out of the N images, defining M as an integer no smaller than 1 and no larger than {N(N−1)/2}. According to this configuration, since the position of the pointing element with respect to the operation surface is detected using the taken images which are obtained by three or more cameras and do not substantially include the shadow of the pointing element 80, it is possible to further improve the detection accuracy of the position of the pointing element with respect to the operation surface.

B. Second Embodiment

FIG. 14 is a front view of a position detection system 900 in a second embodiment. The position detection system 900 has an image display panel 200a, the two cameras, namely the first camera 310 and the second camera 320, for taking the images each including the pointing element 80, and the first illumination section 410 and the second illumination section 420 for emitting the infrared light for detecting the pointing element 80. The configuration of the first camera 310 and the second camera 320, and the first illumination section 410 and the second illumination section 420 is the same as the configuration of these constituents in the first embodiment. The image display panel 200a is a so-called flat panel display. The image display surface of the image display panel 200a corresponds to the operation surface SS.

Figure 15:
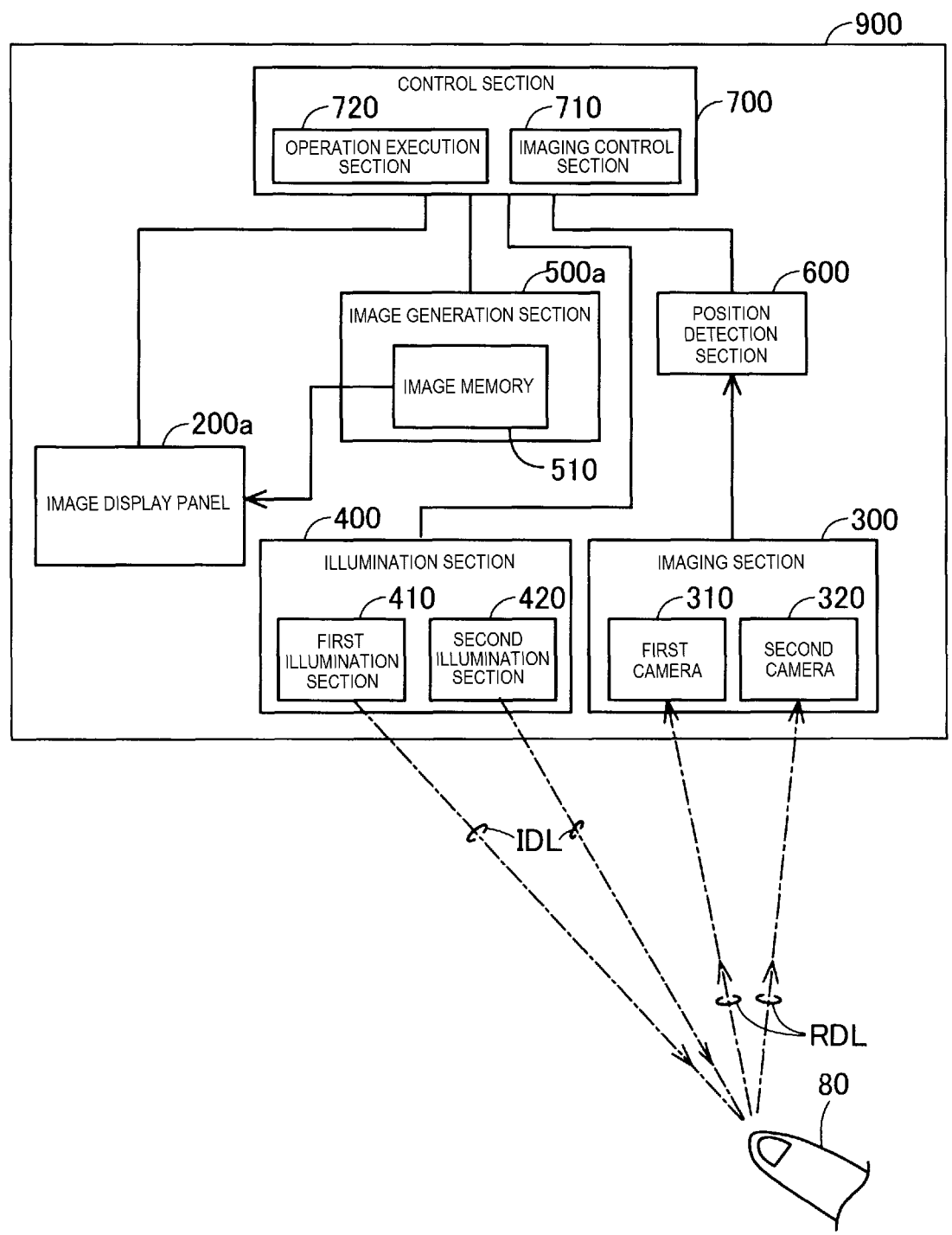
FIG. 15 is a functional block diagram of the position detection system.

FIG. 15 is a functional block diagram of the position detection system 900. The position detection system 900 is obtained by changing the projection section 200 to the image display panel 200a, and the projection image generation section 500 to an image generation section 500a out of the constituents of the interactive projector 100 shown in FIG. 10, and the rest of the constituents are the same as those of the interactive projector 100. Further, the position detection process by the position detection system 900 is substantially the same as the process in the first embodiment described with reference to FIG. 11 through FIG. 13, and therefore, the description will be omitted. Further, the second embodiment also exerts substantially the same advantages as in the first embodiment.

C. Other Embodiments

The present disclosure is not limited to the embodiments described above, but can be implemented in a variety of aspects within the scope or the spirit of the disclosure. For example, the present disclosure can also be implemented in the following aspects. The technical features in each of the embodiments described above corresponding to the technical features in each of the aspects described below can arbitrarily be replaced or combined in order to solve a part or the whole of the problem of the present disclosure, or to achieve some or all of the advantages of the present disclosure. Further, the technical feature can arbitrarily be eliminated unless described in the present specification as an essential element.

(1) According to a first aspect of the present disclosure, there is provided a position detection method of detecting a position of a pointing element with respect to an operation surface. The position detection method includes the steps of (a) obtaining a first taken image by imaging the pointing element with the operation surface as a background using a first camera while performing illumination with a first illumination section disposed so that a shadow of the pointing element on the operation surface is not substantially imaged by the first camera, (b) obtaining a second taken image by imaging the pointing element with the operation surface as a background using a second camera disposed at a different position from a position of the first camera while performing illumination with a second illumination section disposed so that the shadow of the pointing element on the operation surface is not substantially imaged by the second camera, and (c) detecting a position of the pointing element with respect to the operation surface using the first taken image and the second taken image. According to this position detection method, since the first taken image and the second taken image do not substantially include the shadow of the pointing element, it is possible to prevent the position of the pointing element with respect to the operation surface from being falsely detected due to the influence of the shadow. Therefore, it is possible to improve the detection accuracy of the position of the pointing element with respect to the operation surface.

(2) In the position detection method described above, the step (a) and the step (b) may be performed at respective timings different from each other in sequence.

According to this position detection method, by detecting the position of the pointing element with respect to the operation surface using the first taken image and the second taken image obtained at the respective timings different from each other, it is possible to improve the detection accuracy of the position of the pointing element with respect to the operation surface.

(3) In the position detection method described above, the second illumination section may not perform the illumination in the step (a), and the first illumination section may not perform the illumination in the step (b).

According to this position detection method, since the first taken image is not affected by the second illumination section, and the second taken image is not affected by the first illumination section, it is possible to further prevent the first taken image and the second taken image from including the shadow of the pointing element. Therefore, it is possible to further prevent the position of the pointing element with respect to the operation surface from being falsely detected due to the influence of the shadow.

(4) In the position detection method described above, the first illumination section and the second illumination section may perform the illumination with infrared light, the first camera may image reflected light of the infrared light from the first illumination section by the pointing element with the operation surface as the background, and the second camera may image reflected light of the infrared light from the second illumination section by the pointing element with the operation surface as the background.

According to this position detection method, it is possible to improve the detection accuracy of the position of the pointing element with respect to the operation surface while keeping the quality of the image displayed on the operation surface.

(5) In the position detection method described above, the first illumination section may include at least one of a coaxial illumination section configured to perform coaxial illumination to the first camera and an ambient illumination section disposed so as to surround periphery of an optical axis of the first camera, and the second illumination section may include at least one of a coaxial illumination section configured to perform coaxial illumination to the second camera and an ambient illumination section disposed so as to surround periphery of an optical axis of the second camera.

According to this position detection method, it is possible to prevent the first taken image and the second taken image from substantially including the shadow of the pointing element using at least one of the coaxial illumination section and the ambient illumination section.

(6) In the position detection method described above, in the step (c), it may be determined that the pointing element has contact with the operation surface when a distance between the operation surface and the pointing element calculated using the first taken image and the second taken image is no larger than a predetermined threshold value.

According to this position detection method, it is possible to accurately determine that the pointing element has contact with the operation surface.

(7) According to a second aspect of the present disclosure, there is provided a position detection device configured to detect a position of a pointing element with respect to an operation surface. The position detection device includes an imaging section including a first camera configured to obtain a first taken image by imaging the pointing element with the operation surface as a background, and a second camera disposed at a position different from a position of the first camera, and configured to obtain a second taken image by imaging the pointing element with the operation surface as the background, an illumination section including a first illumination section configured to perform illumination so that a shadow of the pointing element on the operation surface is not substantially imaged by the first camera, and a second illumination section configured to perform illumination so that the shadow of the pointing element on the operation surface is not substantially imaged by the second camera, and a position detection section configured to detect a position of the pointing element with respect to the operation surface using the first taken image obtained by the first camera while performing the illumination with the first illumination section, and the second taken image obtained by the second camera while performing the illumination with the second illumination section.

According to this position detection device, since the first taken image and the second taken image do not substantially include the shadow of the pointing element, it is possible to prevent the position of the pointing element with respect to the operation surface from being falsely detected due to the influence of the shadow. Therefore, it is possible to improve the detection accuracy of the position of the pointing element with respect to the operation surface.

(8) In the position detection device described above, there may further be provided with an imaging control section configured to obtain the first taken image and the second taken image in sequence at respective timings different from each other.

According to this position detection device, by detecting the position of the pointing element with respect to the operation surface using the first taken image and the second taken image obtained at the respective timings different from each other, it is possible to improve the detection accuracy of the position of the pointing element with respect to the operation surface.

(9) In the position detection device described above, the first camera may perform imaging to obtain the first taken image at a timing when the second illumination section does not to perform the illumination, and the second camera may perform imaging to obtain the second taken image at a timing when the first illumination section does not perform the illumination.

According to this position detection device, since the first taken image is not affected by the second illumination section, and the second taken image is not affected by the first illumination section, it is possible to further prevent the first taken image and the second taken image from including the shadow of the pointing element. Therefore, it is possible to further prevent the position of the pointing element with respect to the operation surface from being falsely detected due to the influence of the shadow.

(10) In the position detection device described above, the first illumination section and the second illumination section may perform the illumination with infrared light, the first camera may image reflected light of the infrared light from the first illumination section by the pointing element with the operation surface as the background, and the second camera may image reflected light of the infrared light from the second illumination section by the pointing element with the operation surface as the background.

According to this position detection device, it is possible to improve the detection accuracy of the position of the pointing element with respect to the operation surface while keeping the quality of the image displayed on the operation surface.

(11) In the position detection device described above, the first illumination section may include at least one of a coaxial illumination section configured to perform coaxial illumination to the first camera and an ambient illumination section disposed so as to surround periphery of an optical axis of the first camera, and the second illumination section may include at least one of a coaxial illumination section configured to perform coaxial illumination to the second camera and an ambient illumination section disposed so as to surround periphery of an optical axis of the second camera.

According to this position detection device, it is possible to prevent the first taken image and the second taken image from substantially including the shadow of the pointing element using at least one of the coaxial illumination section and the ambient illumination section.

(12) In the position detection device described above, the position detection section may determine that the pointing element has contact with the operation surface when a distance between the operation surface and the pointing element calculated using the first taken image and the second taken image is no larger than a predetermined threshold value.

According to this position detection device, it is possible to accurately determine that the pointing element has contact with the operation surface.

(13) According to a third aspect of the present disclosure, there is provided an interactive projector configured to detect a position of a pointing element with respect to an operation surface. The interactive projector includes a projection section configured to project a projection image on the projection surface, an imaging section including a first camera configured to obtain a first taken image by imaging the pointing element with the operation surface as a background, and a second camera disposed at a position different from a position of the first camera, and configured to obtain a second taken image by imaging the pointing element with the operation surface as the background, an illumination section including a first illumination section configured to perform illumination so that a shadow of the pointing element on the operation surface is not substantially imaged by the first camera, and a second illumination section configured to perform illumination so that the shadow of the pointing element on the operation surface is not substantially imaged by the second camera, and a position detection section configured to detect a position of the pointing element with respect to the operation surface using the first taken image obtained by the first camera while performing the illumination with the first illumination section, and the second taken image obtained by the second camera while performing the illumination with the second illumination section.

According to this interactive projector, since the first taken image and the second taken image do not substantially include the shadow of the pointing element, it is possible to prevent the position of the pointing element with respect to the operation surface from being falsely detected due to the influence of the shadow. Therefore, it is possible to improve the detection accuracy of the position of the pointing element with respect to the operation surface.

What is claimed is:

1. A position detection method of detecting a position of a pointing element with respect to an operation surface, the method comprising:
   (a) obtaining a first taken image by imaging the pointing element with the operation surface as a background using a first camera while performing illumination with a first illumination section disposed so that a shadow of the pointing element on the operation surface is not substantially imaged by the first camera;
   (b) obtaining a second taken image by imaging the pointing element with the operation surface as a background using a second camera disposed at a different position from a position of the first camera while performing illumination with a second illumination section disposed so that the shadow of the pointing element, while present on the operation surface, is not substantially imaged by the second camera; and
   (c) detecting a position of the pointing element with respect to the operation surface using the first taken image and the second taken image.

2. The position detection method according to claim 1, wherein
   the step (a) and the step (b) are performed in sequence at respective timings different from each other.

3. The position detection method according to claim 1, wherein
   the second illumination section does not perform the illumination in the step (a), and
   the first illumination section does not perform the illumination in the step (b).

4. The position detection method according to claim 1, wherein
   the first illumination section and the second illumination section perform the illumination with infrared light,
   the first camera images reflected light of the infrared light from the first illumination section by the pointing element with the operation surface as the background, and
   the second camera images reflected light of the infrared light from the second illumination section by the pointing element with the operation surface as the background.

5. The position detection method according to claim 1, wherein
   the first illumination section includes at least one of a coaxial illumination section configured to perform coaxial illumination to the first camera and an ambient illumination section disposed so as to surround periphery of an optical axis of the first camera, and
   the second illumination section includes at least one of a coaxial illumination section configured to perform coaxial illumination to the second camera and an ambient illumination section disposed so as to surround periphery of an optical axis of the second camera.

6. The position detection method according to claim 1, wherein
   in the step (c), it is determined that the pointing element has contact with the operation surface when a distance between the operation surface and the pointing element calculated using the first taken image and the second taken image is no larger than a predetermined threshold value.

7. A position detection device configured to detect a position of a pointing element with respect to an operation surface, comprising:
   an imaging section including a first camera configured to obtain a first taken image by imaging the pointing element with the operation surface as a background, and a second camera disposed at a position different from a position of the first camera, and configured to obtain a second taken image by imaging the pointing element with the operation surface as the background;
   an illumination section including a first illumination section configured to perform illumination so that a shadow of the pointing element on the operation surface is not substantially imaged by the first camera, and a second illumination section configured to perform illumination so that the shadow of the pointing element, while present on the operation surface, is not substantially imaged by the second camera; and
   a position detection section configured to detect a position of the pointing element with respect to the operation surface using the first taken image obtained by the first camera while performing the illumination with the first illumination section, and the second taken image obtained by the second camera while performing the illumination with the second illumination section.

8. The position detection device according to claim 7, further comprising:
   an imaging control section configured to obtain the first taken image and the second taken image in sequence at respective timings different from each other.

9. The position detection device according to claim 7, wherein
   the first camera performs imaging to obtain the first taken image at a timing when the second illumination section does not perform the illumination, and
   the second camera performs imaging to obtain the second taken image at a timing when the first illumination section does not perform the illumination.

10. The position detection device according to claim 7, wherein
    the first illumination section and the second illumination section perform the illumination with infrared light,
    the first camera images reflected light of the infrared light from the first illumination section by the pointing element with the operation surface as the background, and
    the second camera images reflected light of the infrared light from the second illumination section by the pointing element with the operation surface as the background.

11. The position detection device according to claim 7, wherein
    the first illumination section includes at least one of a coaxial illumination section configured to perform coaxial illumination to the first camera and an ambient illumination section disposed so as to surround periphery of an optical axis of the first camera, and
    the second illumination section includes at least one of a coaxial illumination section configured to perform coaxial illumination to the second camera and an ambient illumination section disposed so as to surround periphery of an optical axis of the second camera.

12. The position detection device according to claim 7, wherein
the position detection section determines that the pointing element has contact with the operation surface when a distance between the operation surface and the pointing element calculated using the first taken image and the second taken image is no larger than a predetermined threshold value.

13. An interactive projector configured to detect a position of a pointing element with respect to an operation surface, comprising:
a projection section configured to project a projection image on the operation surface;
an imaging section including a first camera configured to obtain a first taken image by imaging the pointing element with the operation surface as a background, and a second camera disposed at a position different from a position of the first camera, and configured to obtain a second taken image by imaging the pointing element with the operation surface as the background;
an illumination section including a first illumination section configured to perform illumination so that a shadow of the pointing element on the operation surface is not substantially imaged by the first camera, and a second illumination section configured to perform illumination so that the shadow of the pointing element, while present on the operation surface, is not substantially imaged by the second camera; and
a position detection section configured to detect a position of the pointing element with respect to the operation surface using the first taken image obtained by the first camera while performing the illumination with the first illumination section, and the second taken image obtained by the second camera while performing the illumination with the second illumination section.

* * * * *